(No Model.) 4 Sheets—Sheet 3.

N. FLAMMANG.
MACHINE FOR MAKING METAL BALLS.

No. 592,085. Patented Oct. 19, 1897.

Witnesses.
Griswold
Helen M. Hutchison

Inventor.
Nicolas Flammang
By E. L. Thurston
his atty.

(No Model.) 4 Sheets—Sheet 4.

N. FLAMMANG.
MACHINE FOR MAKING METAL BALLS.

No. 592,085. Patented Oct. 19, 1897.

Witnesses.
F. Griswold
Helen M. Hutchison

Inventor.
Nicolas Flammang
By E. L. Thurston
his atty.

UNITED STATES PATENT OFFICE.

NICOLAS FLAMMANG, OF CLEVELAND, OHIO, ASSIGNOR TO FRANK H. CHAMBERLIN, OF SAME PLACE.

MACHINE FOR MAKING METAL BALLS.

SPECIFICATION forming part of Letters Patent No. 592,085, dated October 19, 1897.

Application filed March 25, 1896. Serial No. 584,893. (No model.)

*To all whom it may concern:*

Be it known that I, NICOLAS FLAMMANG, a citizen of the United States, residing at Cleveland, in the county of Cuyahoga and State of Ohio, have invented certain new and useful Improvements in Machines for Making Metal Balls; and I do hereby declare the following to be a full, clear, and exact description of the invention, such as will enable others skilled in the art to which it appertains to make and use the same.

My invention relates to a machine for automatically making metal balls, the object being to rapidly produce metal balls which are as nearly perfect as possible.

The invention consists in the construction and combination of parts hereinafter described for producing and limiting the feed movement of the wire, for moving the tool-slide, for supporting and steadying the wire while the balls are being formed, and for removing any fins or other projections on the ball after it has been cut from the wire.

Figure 1:
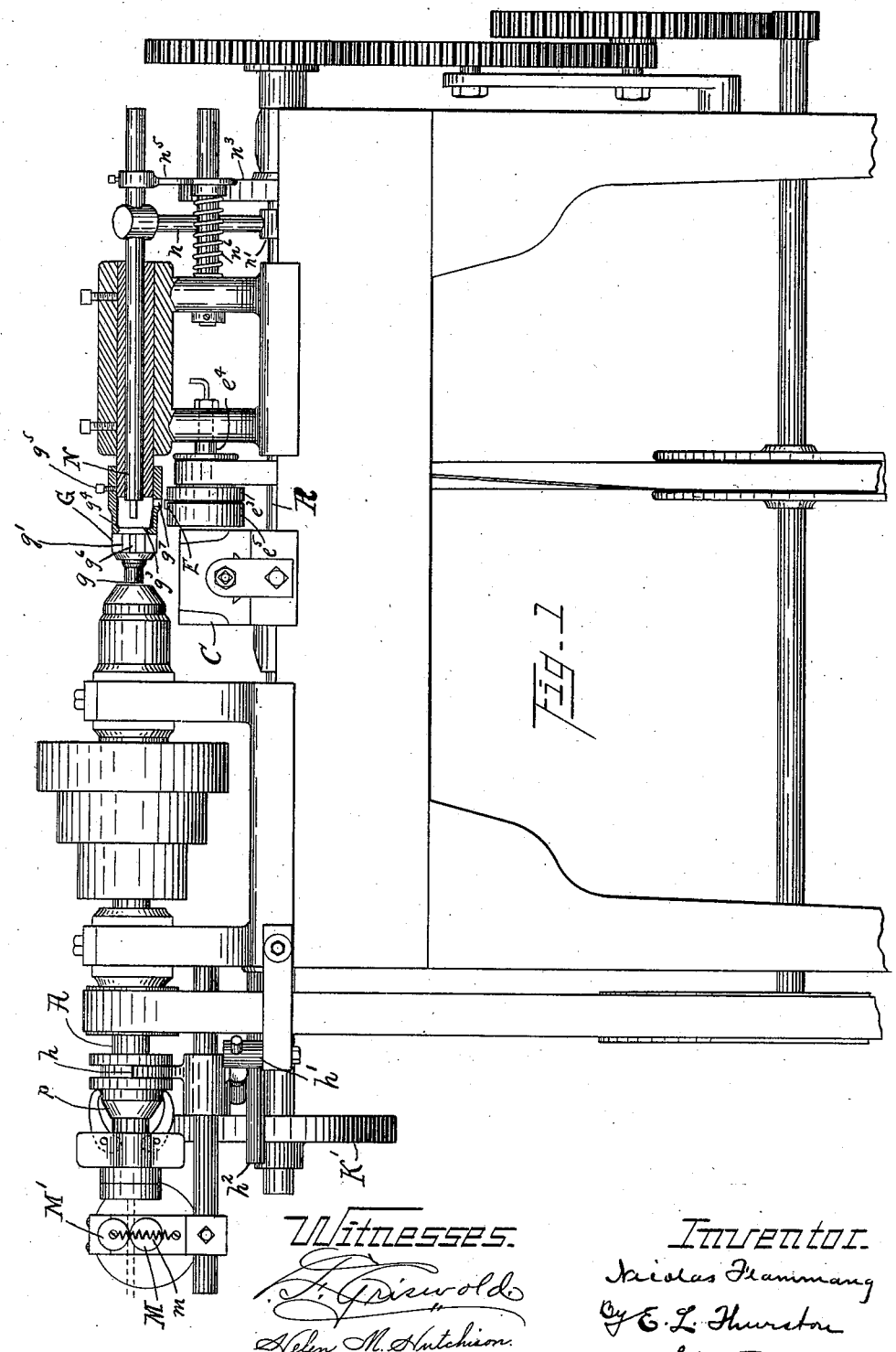
Figure 2:
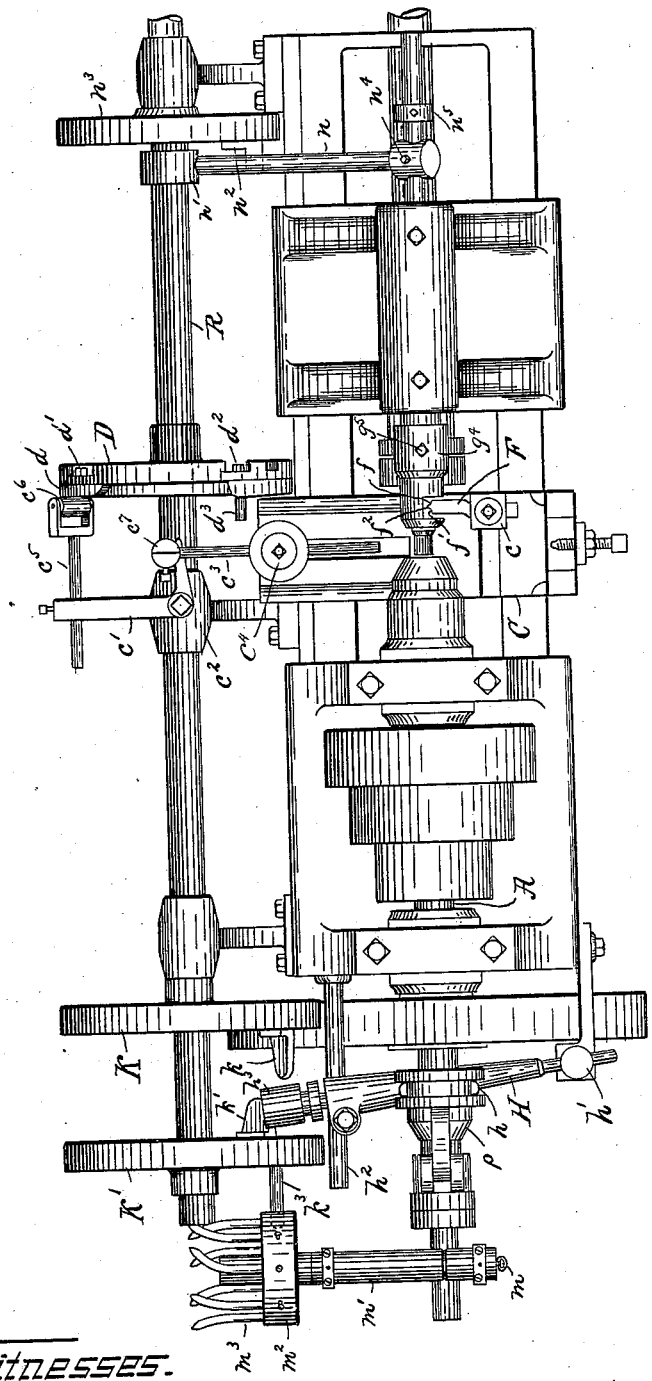
Figure 3:
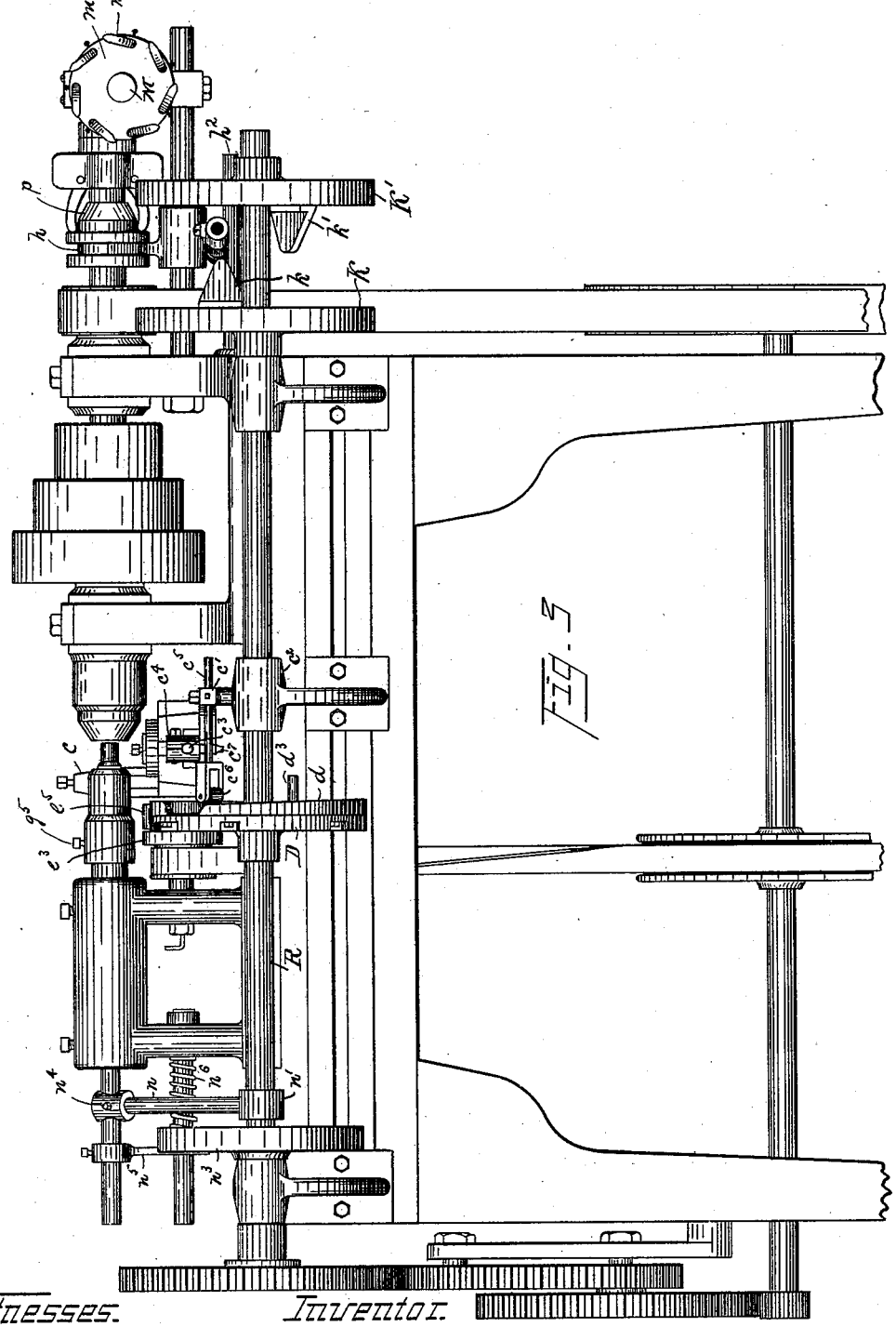
Figure 4:
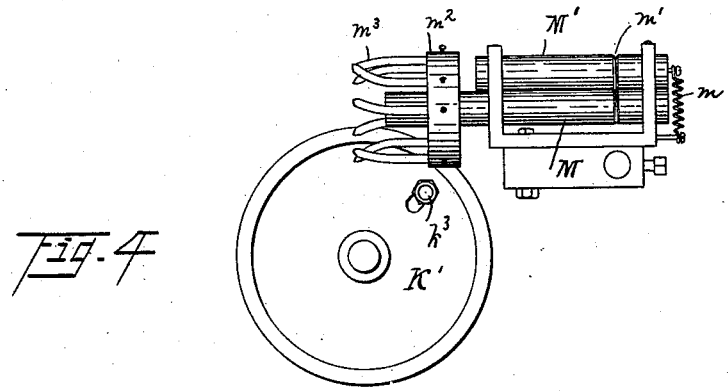
Figure 5:
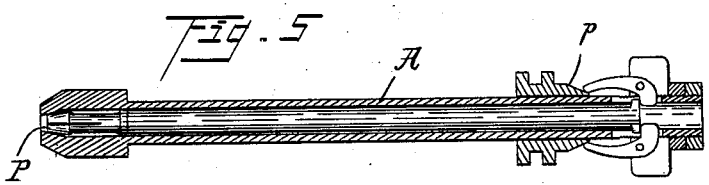
Figure 7:
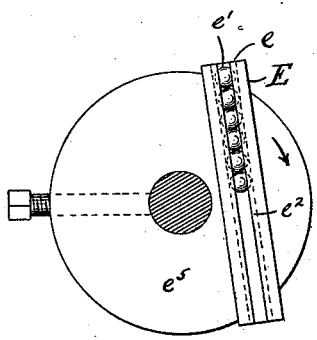
Figure 6:
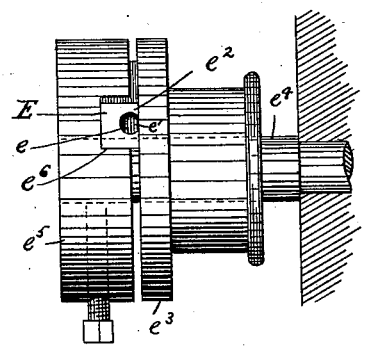

In the drawings, Figure 1 is a front elevation of a machine embodying my invention. Fig. 2 is a plan view thereof. Fig. 3 is a rear elevation. Fig. 4 is a view from the left-hand end of the machine of the wire-feeding mechanism. Fig. 5 is a longitudinal section of the automatic clutching mechanism. Fig. 6 is a top plan view of the ball-finishing mechanism, and Fig. 7 is a side view of the same apparatus when the rotating disk which forms a part thereof is removed.

The machine is a lathe of the variety used for making screws and other analogous articles. The live-spindle A is tubular, whereby the wire may be fed through it endwise. It contains an automatic chuck P, which in the form shown is well known. Any suitable chuck may be used, provided it is adapted to hold the wire while the tool is acting upon it, and to release the wire at intervals, so that it may be fed forward. The chuck is operated by a sleeve or cone $p$, or equivalent device, which is caused to move forward and backward periodically by the following mechanism: A fork $h$, which engages in a groove in said cone, is swiveled on top of a horizontal lever H, which is supported at its front end by a swiveled post $h'$, through which the lever is adapted to move endwise as much as necessary. The rear end of this lever rests and slides upon a fixed horizontal rod $h^2$. Two revolving disks K K' are secured to a suitable shaft R, and the end of the lever H projects between them. On the proximate faces of these disks the cams $k\ k'$ are respectively secured, which cams are adapted to engage with a friction-roller $h^3$ upon the end of said lever. These cams are so placed with reference to each other and to other parts of the wire-feeding mechanism that the cam $k'$ engages and moves the lever (thereby opening the chuck) just before the wire is fed forward, and the other cam $k$ engages with and moves the lever (thereby closing the chuck) immediately after the wire has been fed forward.

The wire-feeding mechanism consists of two rollers M M', mounted in suitable bearings, one above the other. In the form shown the roller M is driven positively at intervals, and the roller M', which is set somewhat loosely in its bearings, is drawn down toward the roller M by a spring $m$. This roller does not, therefore, necessarily move when, or as much as, the roller M moves; and the spring $m$ is made of such strength that if the forward or feed movement of the wire be stopped before the feed movement of the roller M is completed the upper roller M' will cease to move, while the roller M will slip upon the wire. There is, therefore, no danger that the wire will be bent by the action of the rollers to push it forward after its front end has met with an obstructing stop. The wire lies in annular grooves $m'$ in the rollers, whereby it is guided. On the front end of the roller M a disk $m^2$ is secured, and an annular row of curved pins $m^3$ project backward from the face of said disk. A crank-pin $k^3$, which projects to the left from the edge of the disk K', is adapted, as it revolves, to enter between two of these pins, and to engage with one of them temporarily, thereby positively turning the disk $m^2$ and the roller M through a small arc, which results in feeding the wire forward a short distance.

The dead-spindle G is also hollow. The hole in its inner end $g$ receives the end of the wire, whereby the wire is supported and steadied while the ball is being turned. The dead-spindle is slotted on its front side at $g'$ just back from its inner end, and the tool F enters this slot to act upon the work. A longitudinally-movable gage-rod N extends through said spindle from its outer end. An arm $n$ is secured to the projecting rear end of this rod, and the other end of this arm is secured to a collar $n'$, which slides upon the shaft R. A cam $n^2$ on the face of the revolving disk $n^3$ engages with the arm $n$ periodically, and moves it and the gage-rod toward the live-spindle. When said rod is in its extreme forward position, the wire-feeding mechanism operates and pushes the wire against the end of said gage-rod, whereby the wire is stopped in the proper position for the tool to act upon it. It should be here stated that the connection between the gage-rod N and its operating-bar $n$ is adjustable, and the latter may be secured at any point upon the former by a set-screw $n^4$, wherefore said gage-rod will permit different feed movements of the wire, so that different-sized wires may be used to make different-sized balls.

The tool-slide C is provided with a tool-post $c$ near its front end, to which the tool F is secured. The slide is moved slowly backward to draw the tool against the work by means of the following parts, viz: a bell-crank lever $c'$, which is pivoted to the bracket $c^2$; a rod $c^3$, which is adjustably secured to a post $c^4$ on the slide, and has a pin or projection $c^7$, with which one arm of the lever $c'$ engages; a rod $c^5$, which is adjustably secured to the other arm of the said lever $c'$, and has a friction-roller $c^6$ on its end, and a cam $d$ on the face of a disk D, which engages with said roller. This cam is an incomplete ring of increasing thickness, which is secured to the disk by bolts $d'$, and its position is adjusted by set-screws $d^2$. The slide is retracted by means of a pin $d^3$, which projects from the face of the disk D, which pin engages with the end of the carriage. When this engagement takes place, the roller $c^6$ is between the ends of the cam $d$. The cutting movement of the slide is as slow as necessary, depending upon the speed of the cam-shaft R and the pitch of the cam; but the return movement of the slide is very quick.

The tool F is shaped substantially as shown, so that it has two cutting-surfaces $f\ f'$ on opposite sides of the center, or cutting-off portion $f^2$, and each of these cutting-surfaces is in the form of a quarter-circle. It is obvious that this tool cuts the last half of one ball while it is cutting the first half of another ball.

For simplicity and economy of construction all of the cam-disks K, K', $n^3$, and D are secured to a single shaft R, although it is obvious that this is not an essential feature of the invention. This shaft is to be run as fast as possible, in view of the requirement that the tool shall cut the balls smoothly. It is clear from the foregoing description that at each revolution of this shaft the gage-rod is moved forward, the wire is released from the chuck, and then fed forward against the gage-rod. The chuck grasps the wire, the tool-slide is moved to complete and cut off a ball, and then is returned in readiness to repeat this operation. The gage-rod is retracted as soon as the wire is grasped by the chuck by a coil-spring $n^6$, which is compressed between an arm $n^5$, which is secured to the gage-rod, and a fixed part of the machine. As the balls are cut off they drop into a recess $g^3$ in the end of the dead-spindle, or, more properly, in a removable piece $g^4$, which is secured to the end of the dead-spindle by a set-screw $g^5$. This piece is made removable, so that for each different-sized wire a piece $g^4$ may be substituted, which has a hole $g^6$ in the end, of suitable size for the reception of the wire. The balls when they are cut off are apt to have two small fins or projections at the points where they are cut from the wire, and these fins must be removed before the balls are ready for use. To effect this result, I provide the mechanism which I will now proceed to describe.

A tube E, the bore $e$ of which fits the balls which are being made, is placed and held so that the balls which drop into the recess $g^3$ escape therefrom through a hole $g^7$ and fall into the upper slightly-flaring end of said bore. One side $e^2$ of this tube is planed, milled, or otherwise cut away, so that the plane of this side intersects the bore $e$, thereby forming a slot $e'$, having sharp cutting edges, through which the balls in said bore must project slightly. A revolving disk $e^3$ is placed so that its face is close to the face $e^2$ of the tube E, and so that it will be in contact with the projecting part of the balls. As this disk revolves it turns the balls in the tube. The fins on the balls are brought into contact with the cutting edges of said slot, and are thereby cut off, so that when the balls drop from the lower end of the tube they are substantially spherical. In the construction shown, this disk $e^3$ is loosely mounted on a fixed shaft $e^4$, and is revolved by a belt which engages with its hub. The tube is supported by a plate $e^5$, which is secured to said shaft by a set-screw or other suitable means. In the face of said plate, next to the disk, is a groove $e^6$, which receives and holds the said tube E. This plate may be secured to the shaft so that the tube shall set at any desired angle which will cause the balls to move at any desired speed through it. The piece $g^4$ may also be adjusted upon the dead-spindle, so that the balls drop from the hole $g^6$ into the end of said tube E.

Having described my invention, I claim—

1. In a machine of the character described, a wire-feeding device, consisting of the following parts, in combination, two feed-rollers, a disk secured to one of them, curved pins which project in an annular row from the face of said disk, a crank-pin revolving about an axis at right angles to the axis of said disk, and adapted to engage with said curved pins, substantially as and for the purpose specified.

2. In a machine of the character described, the combination of a tubular live-spindle, a chuck and its operating mechanism, and a wire-feeding device, with a tubular dead-spindle, a gage-rod movable endwise through the dead-spindle, and mechanism for moving it forward just before the wire is fed, and back just after the wire is fed, substantially as and for the purpose specified.

3. In a machine of the character described, the combination of a tubular live-spindle, a chuck and its operating mechanism, and a wire-feeding device, with a tubular dead-spindle, a gage-rod movable longitudinally in said spindle, an arm adjustably secured to said gage-rod, a cam adapted to engage with and operate said arm, and a spring for retracting the gage-rod, substantially as and for the purpose specified.

4. In a machine of the character described, the combination of a live-spindle, a chuck and its operating mechanism, and a wire-feeding device, with a tubular dead-spindle, a gage-rod movable longitudinally in said dead-spindle, an arm adjustably secured to said gage-rod, a shaft which passes loosely through one end of said arm, thereby supporting and guiding it, a cam adapted to engage with said arm to move it forward, and a spring for retracting said gage-rod, substantially as and for the purpose specified.

5. In a machine of the character described, the combination of a tubular dead-spindle, and a tubular end piece secured thereto having a slot through one side which permits of the entry of the cutting-tool, substantially as and for the purpose specified.

6. In a machine of the character described, the combination of a transversely-movable tool-slide, a bell-crank lever pivoted to a fixed support, a rod $c^3$ secured to the carriage and having a projection with which one arm of the bell-crank lever engages, a revolving cam, and an arm secured to the bell-crank lever and adapted to be engaged by said cam, substantially as and for the purpose specified.

7. In a machine of the character described, the combination of a transversely-movable tool-slide, a bell-crank lever pivoted to a fixed support, a rod secured to the tool-slide having a projection with which one arm of the bell-crank lever engages, a revolving disk having on its face a cam which is an incomplete ring, an arm secured to the bell-crank lever adapted to engage with said cam, and a pin secured to said disk for engagement with the slide for the purpose of retracting the same, substantially as and for the purpose specified.

8. In a machine of the character described, the combination of a tubular live-spindle, a chuck and its operating mechanism, a tubular dead-spindle adapted to receive the end of the wire on which a ball is to be formed, it having also a slot for the admission of the cutting-tool, said dead-spindle also having a hole in or near its bottom through which the balls which are cut from the wire may be discharged, substantially as and for the purpose specified.

9. In a machine of the character described, the combination of a tube having a flat face which intersects the bore, and a revolving disk which faces and is placed close to said side of the tube, substantially as and for the purpose specified.

10. In a machine of the character described, the combination of a tube having a flat face which intersects the bore, mechanism for supporting said tube, a device for directing the balls as they are cut from the wire into the upper end of said tube, and a rotating disk mounted in front of and close to said face of the tube, substantially as and for the purpose specified.

11. In a machine of the character described, the combination with a tubular dead-spindle adapted to catch the balls as they are cut from the wire and provided with an opening through which said balls may be discharged, with a fixed shaft, a fixed plate adjustably secured thereto, a tube supported by said plate and having a flat face which intersects the bore of the tube, and a rotating disk mounted on said shaft in front of and close to said side of the tube, substantially as and for the purpose specified.

In testimony whereof I affix my signature in presence of two witnesses.

NICOLAS FLAMMANG.

Witnesses:
FRANK H. CHAMBERLIN,
E. L. THURSTON.